United States Patent [19]

Schmidt

[11] 4,297,314
[45] Oct. 27, 1981

[54] METHOD FOR PERMANENT DEFORMATION OF AN ELASTIC MEMBER

[75] Inventor: Waldemar Schmidt, Waiblingen, Fed. Rep. of Germany

[73] Assignee: Robert Bosch GmbH, Stuttgart, Fed. Rep. of Germany

[21] Appl. No.: 963,710

[22] Filed: Nov. 27, 1978

[30] Foreign Application Priority Data

Dec. 1, 1977 [DE] Fed. Rep. of Germany ....... 2753541

[51] Int. Cl.³ ...................... B29C 17/03; B29D 23/10; B29H 5/01; B29H 5/16
[52] U.S. Cl. .................................... 264/320; 264/348
[58] Field of Search ............... 264/291, 292, 231, 327, 264/522, 320, 322, 348; 26/509, 544, 522, 327, 320, 501; 425/407

[56] References Cited

U.S. PATENT DOCUMENTS

| | | | |
|---|---|---|---|
| 2,363,508 | 11/1944 | Doster et al. | 264/327 |
| 2,962,757 | 12/1960 | Slemmons et al. | 264/231 |
| 3,040,383 | 6/1962 | Nassimbene | 264/231 |
| 3,142,089 | 7/1964 | Wilkalis et al. | 264/544 |
| 3,244,779 | 4/1966 | Levey et al. | 264/327 |
| 3,294,883 | 12/1966 | Polka | 264/327 |
| 3,488,413 | 1/1970 | Watts | 425/509 |
| 3,614,811 | 10/1971 | Johnson | 264/314 |
| 3,739,052 | 6/1973 | Ayres et al. | 264/522 |
| 3,814,784 | 6/1974 | Wolf | 264/327 |
| 3,896,207 | 7/1975 | Cospen et al. | 264/327 |
| 3,929,952 | 12/1975 | Edwards | 264/327 |
| 3,933,967 | 1/1976 | Taylor | 264/327 |

OTHER PUBLICATIONS

Anon. Webster's Seventh New Collegiate Dictionary, Merriam, Springfield, Mass., (1966), p. 751 relied on.
Gove, Webster's Third New Int'l. Dictionary, Merriam, Springfield, Mass., (1963), p. 730 relied on.
Wright et al., Solid Polyurethane Elastomers, MacLaren, London, (1969), pp. 7, 8, 260-264 relied on.

*Primary Examiner*—W. E. Hoag
*Attorney, Agent, or Firm*—Edwin E. Greigg

[57] ABSTRACT

In order to impart a permanent out-of-plane configuration to a flexible diaphragm, for example a diaphragm used as the valve closing member in a multiple fuel metering valve, the invention provides that the diaphragm material, which may preferably be a rubberized textile web, is held by friction between two cooperating plates while a punch and die set causes deformation of parts of the diaphragm. In order to provide permanence to the deformation, the punch and/or die are heated during the deformation process while the remaining parts of the diaphragm are unheated and may be cooled. In a particular embodiment, the punch and die set imparts a plurality of dish-shaped depressions to the diaphragm; these serve to hold valve closing members for a multiple fuel distribution valve. The permanent depressions serve to hold the valve closing plates without mechanical attachment and/or perforation of the diaphragm and do not add undesirable rigidity to the diaphragm.

1 Claim, 3 Drawing Figures

METHOD FOR PERMANENT DEFORMATION OF AN ELASTIC MEMBER

BACKGROUND OF THE INVENTION

The invention relates to a method and apparatus for imparting a permanent deformation to an elastic member made preferably from a coated web. More particularly, the invention relates to the permanent deformation of a coated web in a heated press. It has been previously proposed to apply heat during the deformation of a member made from a coated web. However, it has been found that after the parts of the elastic member had cooled off, the deformation imparted to the member deviated in an unpredictable way from the desired shape and location. When these deviations are combined with the unavoidable fluctuations in the quality of individual raw materials, the result becomes intolerable from the point of view of reliable use. The disadvantages of the known process are primarily due to the fact that, when the coated web is heated to for example 70° C., it is subject to a contraction which is reversed when the web cools down, resulting in a return of the, for example, dish-shaped deformation of the part to a plane configuration.

OBJECT AND SUMMARY OF THE INVENTION

It is thus a principal object of the present invention to provide a method and an apparatus for so deforming an elastic member, especially in elastic member made of a coated web, that the deformations are permanent and remain substantially unchanged when the material returns to normal temperature. This object is attained according to the invention in that heat is applied to the member only in the region of deformation.

It is a further feature of the invention that the member is cooled everywhere except where it is being deformed.

Yet another advantageous feature of the invention is the provision of an apparatus for carrying out the deformation in which there is supplied at least a base plate and a cover plate which hold the blank to be deformed while a separate die performs the deformation with local heating.

The invention will be better understood as well as further objects and advantages thereof become more apparent from the ensuing detailed description of an exemplary embodiment taken in conjunction with the drawing.

DESCRIPTION OF THE PREFERRED EMBODIMENT

Figure 1:
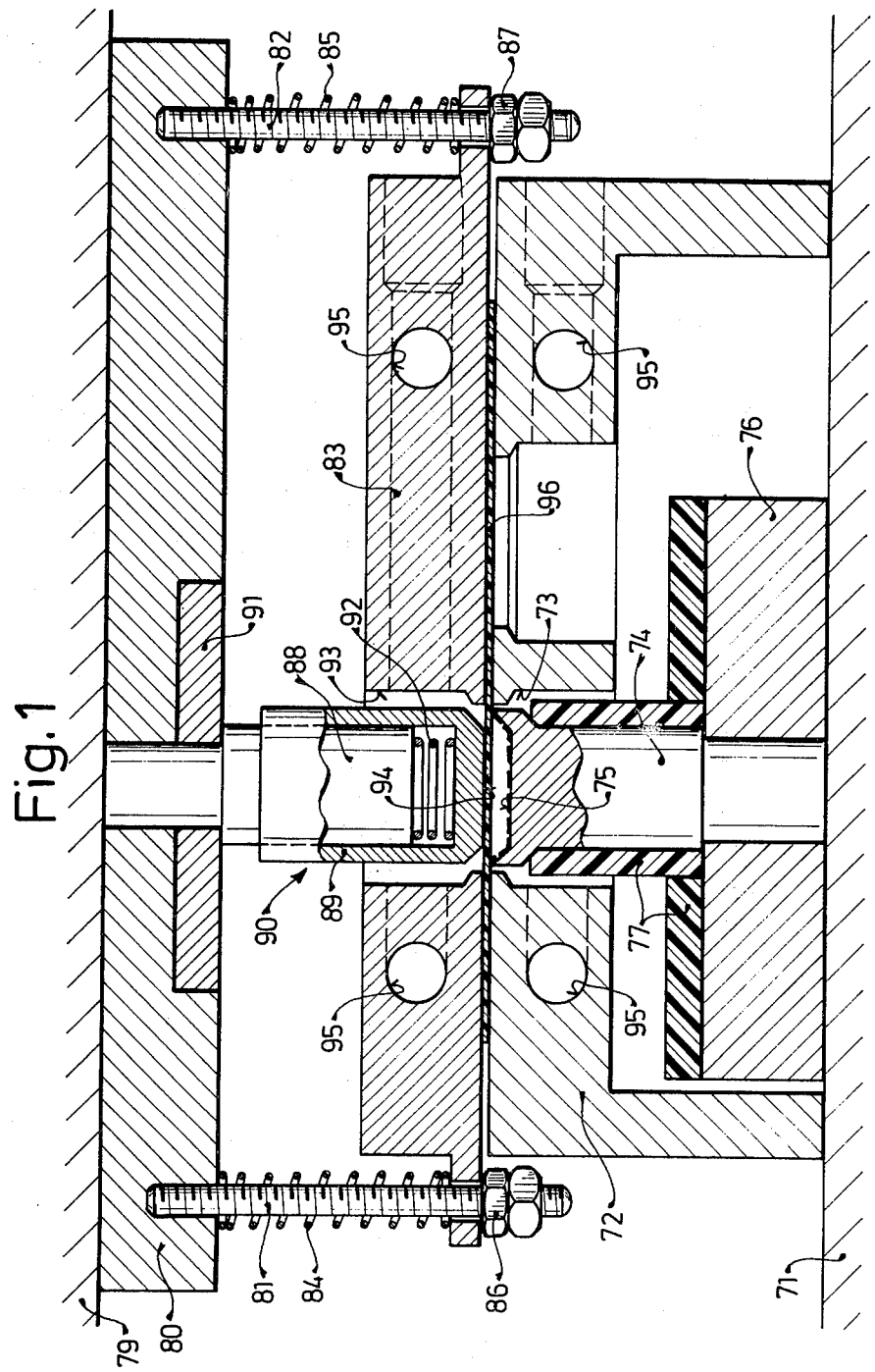
FIG. 1 is a simplified and partially sectional illustration of an apparatus for carrying out the method according to the invention.

Turning now to FIG. 1, there will be seen an apparatus, for example a commercial press, which serves to impart a permanent deformation to an elastic material, especially to a member made from a coated web. The press will be seen to include a known fixed press table 71 having a base plate 72. An opening 73 in the base plate 72 is penetrated by a stamping die 74 attached to the press table 71 and serving as a positive die having a dish-shaped working surface 75. Preferably, the stamping die 74 is constructed of a material having high thermal conductivity and is surrounded at least partially by a regulated electrical heating element 76 of known construction. The stamping die 74 and the heater 76 are thermally insulated by material 77 with respect to the base plate 72. The movable punch table 79 of the press has a guide plate 80 in which are affixed guide bolts 81, 82 which support a cover plate 83 of the apparatus. Coaxially surrounding the guide bolts 81, 82 are springs 84, 85 which urge the cover plate 83 onto nuts 86, 87 threaded onto the bolts 81, 82. Also attached to the guide plate 80 is an actuating punch 88 which guides a surrounding sleeve 89 which constitutes a die stamp 90 which is at least partially surrounded by an electrically regulated heater element 91 of known construction. A compression spring 92 is located in the space defined between the end face of the actuating punch 88 and the interior of the sleeve 89. The die stamp 90 penetrates the cover plate 83 in an opening 93 and is disposed coaxially with the stamping die 74 and cooperates therewith to produce for example a dish-shaped depression in the deformable blank.

Suitably, the die stamp 90 and the electrically heated element 91 are also insulated thermally with respect to the cover plate 83 although this is not shown in the drawing. It is also advantageous if channels 95 are provided in the base plate 72 and in the cover plate 83 for the purpose of passing a cooling medium therethrough.

The manner of operation of the apparatus described so far is as follows. The stamping die 74 and the die stamp 90 are held at a predetermined desirable operating temperature by the electrically regulated heaters 76, 91 whereas the base plate 72 and the cover plate 83 are cooled by passage of the cooling medium through the channels 95. When the apparatus is disengaged, i.e., opened, a blank of a coated web material is admitted and correctly placed in the apparatus by a guide means, not shown. When the press is actuated, the punch table 79 descends and clamps the deformable part 96 between the base plate 72 and the cover plate 83 at a selectable amount of tension due to the changeable pretension of the springs 84 and 85. The degree of clamping is such that any necessary yielding of the material required to produce for example the dish-shaped depressions of the part 96 is possible. The embodiment of the apparatus as illustrated according to the invention makes it possible to heat the deformable part 96 only within the region of deformation, i.e., in the region defined by the stamping die 74 and die stamp 90. The remaining parts of the deformable member are kept substantially at room temperature. Due to this differential heating of the parts of the deformable member, the deformed region does not return into the plane of the blank. The intended deformation of the part 96 is illustrated in dashed lines along the working surface 75 of the stamping die 74. It is to be understood that the apparatus may include other suitably shaped dies and stamps for a simultaneous further deformation of the part 96.

Figure 2:
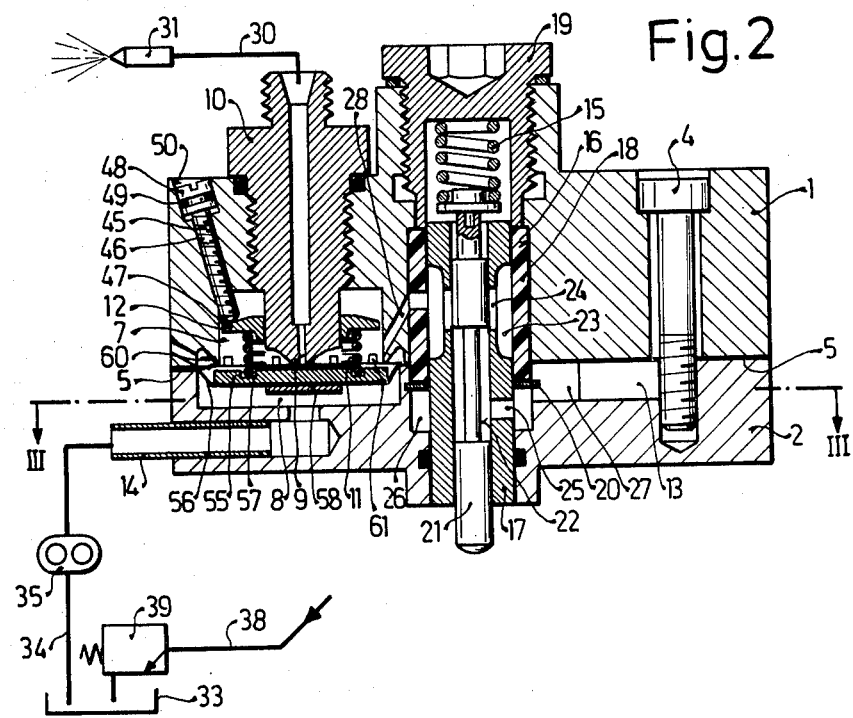
FIG. 2 is a partially sectional view of an apparatus in which a member produced according to the invention is used.
Figure 3:
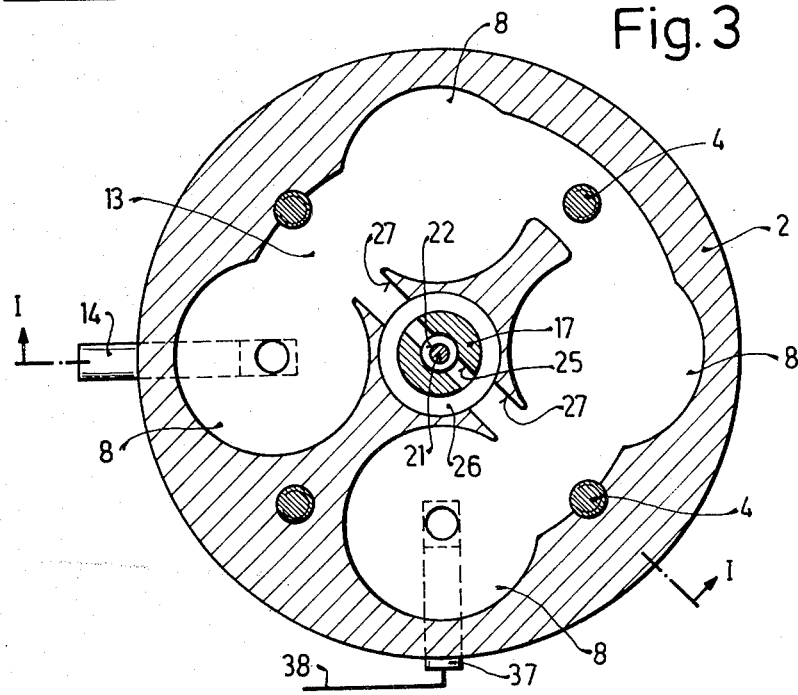
FIG. 3 is a top view of a part of the valve mechanism illustrated in FIG. 2.

The utilization of a member which has been produced according to the process of the invention and in an apparatus substantially as described above, is illustrated in FIGS. 2 and 3. FIG. 2 is an illustration of a fuel metering and distributor valve of a fuel injection system having a housing top 1 and a housing bottom 2 which are axially clamped by bolts 4. Clamped between the top 1 and the bottom 2 is an elastic diaphragm 5 which is the deformable member made according to the present invention. The diaphragm serves to divide a number of axial bores distributed uniformly around the axis of the housing into respective chambers 7 and 8 and also serves as the movable valve-closing member in these chambers. The elastic diaphragm is made of an elastic material, preferably of some synthetic, web-reinforced synthetic or web-reinforced rubber. The exemplary embodiment illustrated in FIG. 2 is a fuel metering and distribution valve for a 4-cylinder internal combustion engine which includes four diaphragm valves. The fixed valve seat 9 is a part of a valve seat carrier 10 which is threadedly mounted or pressed into the housing top 1 and which serves as a connection for fluid lines 30 which lead to the injection valves 31 of the engine of which only one is known. Disposed coaxially to the valve seat 9 in the chamber 7 is a valve spring 11 having preferably a small spring constant and supported, on the one side, by a valve plate 55 and, on the other side, by a spring support cup 12, the latter being slidingly carried on a guide section of the valve seat carrier 10 which extends into the chamber 7. In the inoperative condition of the valve, the valve spring 11 causes the valve plate 55 to hold the valve open.

The chambers 8 located in the bottom 2 of the housing are connected with one another by an annular channel 13 in such a manner as to permit fluid to flow sequentially from one chamber 8 to the next. The first of these chambers 8 is supplied with fuel by a continuously operating pump 35 which takes fuel from a container 33 and delivers it through a line 34 and a connecting part 14. From the last of the chambers 8, a connectng piece 37 and a line 38 lead to a pressure maintenance valve 39 and back to the fuel container 33.

An axial bore 16 which penetrates the top and bottom parts of the housing contains a guide bushing 17 which is held in place, secured against axial and rotary displacement, by an elastic sealing sleeve 18 which may be made of rubber. A plug 19 compresses the sealing sleeve 18 axially against a disc 20 located in the housing bottom 2.

A control plunger 21 slides axially within the guide bushing 17 and is provided with an annular control groove 22. A spring 15 urges the plunger 21 away from the plug 19. The function of the spring 15 could also be assumed by pressurized fluid which would impinge upon the end face of the control slide 21 and which would be produced by a hydraulic pressure system, not shown. The guide bushing 17 has axial grooves 23 which communicate with identically equal and axially parallel longitudinal slots 24 which perform the function of control slots. Depending on the axial position of the plunger 21, the effective cross section provided by the cooperation of the annular groove 22 and the control slots 24 is made variable. The guide bushing also has radial bores 25 which provide an uninterrupted communication as between the annular groove 22 and an annular channel 26 in the housing bottom. Radiating from the annular channel 26 are channels 27 which lead to the annular channel 13 so that the channel 26 is in communication with the chambers 8 of the diaphragm valves. The longitudinal grooves 23 of the guide bushing 17 are connected via channels 28 with individual ones of the chambers 7 of the diaphragm valves, there being associated with each diaphragm valve one longitudinal groove 23 and an associated control slot 24. The chambers 7 of the diaphragm valves are separated from one another.

The spring support cup 12, which is movably supported on the part of the valve seat carrier which extends into the chamber 7, is pressed by the valve spring 11 against an adjustment screw 45. The adjustment screw 45 is disposed in a threaded bore 46 and extends, preferably obliquely to save space, into the chamber 7. The tip of the adjustment screw 45 makes contact with the beveled edge 47 of the spring support cup. A sealing ring 49 may be disposed in the groove of the screw head 48 for the purpose of sealing and securing the position of the screw 45. The sealing ring 49 makes contact with the walls of the bore 50 which contains the screw head.

It is further provided by the invention that the valve plate 55 lies loosely in a preformed and dish-shaped pocket 56 of the diaphragm which is manufactured according to the method described in the present invention. The valve plate 55 is centered in this pocket 56 by the valve spring 11 which engages an annular groove 57 of the plate 55. The depth of the preformed pocket 56 of the diaphragm is approximately equal to the thickness of the valve plate 55 so that, during the normal operation of the valve, the face of the valve plate 55 adjacent to the valve seat 9 lies substantially in the clamping plane of the diaphragm. A stop member 58 which is fixedly attached to the chamber 8 limits the maximum excursion of the elastic diaphragm 5 and hence also of the valve plate 55.

Disposed concentrically within the chambers 7 are support rings 60 which are attached to the housing and which have narrow, almost knife-edge-like end faces and which are so disposed that, when the valve is closed, the valve plate makes contact with the valve seat 9 and with the edges of the support ring 60. It is advantageous for reasons of manufacture to provide the knife-edge end-faces of the support rings as well as the valve seats 9 in the clamping plane of the diaphragm 5. The diameter of the knife-edge side of the support ring 60 is smaller than the diameter of the valve plate 55. The support rings are perforated by radial openings 61 which permit an equalization of pressure in the chambers 7 when the valve plate 55 is in contact with a support ring 60.

The operation of the fuel metering and distribution valve described above is as follows. A continuously operating fuel pump 35 transports fuel from the fuel container 33 through the line 34 and the connection piece 14 into one of the chambers 8 of the diaphragm valves. Fuel then flows through the annular channel 13 to the other chambers 8 of the successive diaphragm valves whereafter it partially flows through the connection piece 37, the line 38 and the pressure maintenance valve 39 back to the fuel container 33. The remainder of the fuel flows through the channels 27 to the annular channel 26 and further through the radial bores 25 to the annular control groove 22 of the control plunger 21. Depending on the position of the plunger, the control groove 22 more or less opens the control slot 24 so that fuel is metered thereby and flows into the longitudinal grooves 23 whereafter it enters the channels 28 and flows into the chambers 7 of the diaphragm valves. The elasticity of the diaphragm and the force of the valve spring 11 are so chosen that, when the pressure drop between the chambers 7 and 8 of the diaphragm valves changes, the free-flow cross section as between the valve plate 55 and the valve seat 9 changes until the previously selected pressure drop is reached again. This adjustment takes place in an extraordinarily short time due to the flat-seat construction of the valve because a very small stroke of the diaphragm drastically changes the free-flow cross section. In the illustrated fuel metering and distribution valve which is intended for fuel injection systems, the maximum opening strokes for the largest amount of flow in the valve are approximately 0.1 millimeter. During such a minute stroke, the force of the spring changes practically not at all so that the control system can operate very precisely, i.e., the pressure gradient is independent of the flow rate and is substantially constant.

In order to facilitate the installation of a valve of this type and to tune the adjustment of each of the individual valves or to change the characteristics to some other value, there is provided an adjustment means 45 which permits a displacement of the spring support cup 12 on the part of the valve seat carrier 10 which extends into the chamber 7 and which thus permits a change in the pretension of the valve spring 11. Due to the use of a soft and pliable elastic diaphragm, especially a diaphragm made of a coated web, the diaphragm has virtually no rigidity and thus diminishes the problems which normally occur when several valves are controlled simultaneously. A permanent attachment of the valve plates to the diaphragm has been found to be unreliable and expensive. For this reason, the individual valve plates 55 are loosely inserted into the preformed pockets 56 associated with each of the individual valves and their position is secured by the valve springs 11. The maximum displacement of the diaphragm 5 and hence also of the valve plates 55 is limited by a stop 58 disposed in each of the chambers 8. The presence of the stops 58 prevents an undesirable excessive stretching of the diaphragm when the valve is inoperative. The stops further prevent the occurrence of a pumping effect which the valve would tend to perform initially when the valve plate approaches the valve seat 9.

During operation of the valve, the valve plate 55 normally makes contact with an indeterminate point of the facing edge of the support ring 60. That point then acts as a hinge which causes a frictionless movement of the valve plate toward the valve seat 9 without thereby inducing oscillations in the diaphragm and the valve plate. In this manner, the diaphragm valves are capable of providing well-defined opening and closing motions which in turn permits a highly precise control sufficient for even stringent requirements.

The foregoing relates to preferred exemplary embodiments of the invention, it being understood that other embodiments and variants thereof are possible without departing from the spirit and scope of the invention. What is claimed and desired to be secured by letters Patent of the United States is:

1. A method for producing a permanently deformed flexible diaphragm, comprising the steps of:

applying to a permanently deformable flexible diaphragm essentially consisting of a coated rubberized web intended for use as a valve closing member, distending forces to selected parts of a diaphagm which parts are to be displaced out-of-plane thereof to produce a dish-shaped depression in the diaphragm;

applying heat to only said selected parts of the diaphragm which are subjected to the out-of-plane distending forces and while cooling only parts, other than said selected parts, of the diaphragm which are free from distending forces including passing of a cooling medium through channels in a base plate and in a cover plate confining the diaphram therebetween.

* * * * *